United States Patent
Gukelberger et al.

(10) Patent No.: US 10,465,636 B2
(45) Date of Patent: Nov. 5, 2019

(54) INTERNAL COMBUSTION ENGINE HAVING DEDICATED EGR CYLINDER(S) WITH DELAYED FUEL INJECTION

(71) Applicant: Southwest Research Institute, San Antonio, TX (US)

(72) Inventors: Raphael Gukelberger, San Antonio, TX (US); Bradley Denton, San Antonio, TX (US)

(73) Assignee: Southwest Research Institute, San Antonio, TX (US)

( * ) Notice: Subject to any disclaimer, the term of this patent is extended or adjusted under 35 U.S.C. 154(b) by 0 days.

(21) Appl. No.: 15/439,875

(22) Filed: Feb. 22, 2017

(65) Prior Publication Data
US 2018/0238247 A1 Aug. 23, 2018

(51) Int. Cl.
*F02D 41/00* (2006.01)
*F02M 26/41* (2016.01)
*F02D 41/40* (2006.01)
*F02M 26/43* (2016.01)

(52) U.S. Cl.
CPC ............ *F02M 26/41* (2016.02); *F02D 41/008* (2013.01); *F02D 41/0065* (2013.01); *F02D 41/401* (2013.01); *F02M 26/43* (2016.02); *F02D 2250/38* (2013.01); *Y02T 10/44* (2013.01); *Y02T 10/47* (2013.01)

(58) Field of Classification Search
CPC .............. F02D 41/0065; F02D 41/008; F02D 41/0082; F02D 41/401; F02M 26/43

USPC ..................................................... 123/568.11
See application file for complete search history.

(56) References Cited

U.S. PATENT DOCUMENTS

| | | | | |
|---|---|---|---|---|
| 6,138,650 A * | 10/2000 | Bailey | ..................... | F02B 47/08 123/443 |
| 6,543,230 B1 * | 4/2003 | Schmid | ............... | F02D 41/0065 123/568.11 |
| 6,789,531 B1 * | 9/2004 | Remmels | ................ | F02B 47/08 123/357 |
| 2001/0039941 A1 * | 11/2001 | Yamada | .................. | F02D 37/02 123/406.14 |
| 2004/0060527 A1 * | 4/2004 | Hitomi | ...................... | F02D 9/04 123/58.8 |
| 2004/0065278 A1 * | 4/2004 | Nishimoto | .............. | F01L 1/143 123/58.8 |
| 2004/0065279 A1 * | 4/2004 | Hitomi | .................... | F01L 1/267 123/58.8 |

(Continued)

FOREIGN PATENT DOCUMENTS

| | | | | |
|---|---|---|---|---|
| DE | 10357402 A1 * | 7/2005 | ............... | F01N 3/02 |
| FR | 3002589 A1 * | 8/2014 | ........... | F02D 41/008 |

(Continued)

*Primary Examiner* — John M Zaleskas
(74) *Attorney, Agent, or Firm* — Livingston Law Firm

(57) ABSTRACT

A method of controlling fuel injection to the cylinders of an internal combustion engine, the engine having exhaust gas recirculation (EGR) from at least one dedicated EGR (D-EGR) cylinder, with the other cylinders being main cylinders. The D-EGR cylinder(s) are run at a richer equivalence ratio than the main cylinders, with the goal of providing increased H2 and CO in the recirculated exhaust. The start of fuel injection to the D-EGR cylinder(s) is delayed as compared to the start of fuel injection to the main cylinders.

17 Claims, 5 Drawing Sheets

(56) References Cited

U.S. PATENT DOCUMENTS

| | | | | |
|---|---|---|---|---|
| 2006/0112940 A1* | 6/2006 | Roberts, Jr. | F02D 25/00 | 123/568.11 |
| 2009/0308070 A1* | 12/2009 | Alger, II | F02D 13/0238 | 60/602 |
| 2010/0211292 A1* | 8/2010 | Geyer | F02M 26/39 | 701/108 |
| 2011/0253113 A1* | 10/2011 | Roth | F02D 41/008 | 123/568.12 |
| 2012/0078492 A1* | 3/2012 | Freund | F02D 41/0065 | 701/108 |
| 2013/0030672 A1* | 1/2013 | Klingbeil | F02D 41/0085 | 701/109 |
| 2013/0220286 A1* | 8/2013 | Gingrich | F02D 41/0065 | 123/568.11 |
| 2013/0220288 A1* | 8/2013 | Klingbeil | F02D 41/0065 | 123/568.12 |
| 2014/0034014 A1* | 2/2014 | Blythe | F02D 41/1497 | 123/435 |
| 2014/0041384 A1* | 2/2014 | Mischler | F02D 41/0007 | 60/605.2 |
| 2014/0142833 A1* | 5/2014 | Gingrich | F02D 41/0255 | 701/103 |
| 2014/0190458 A1* | 7/2014 | Gingrich | F02B 47/08 | 123/568.2 |
| 2014/0196697 A1* | 7/2014 | Burrahm | F02M 26/43 | 123/568.11 |
| 2014/0305416 A1* | 10/2014 | Gukelberger | F02M 26/43 | 123/568.21 |
| 2015/0114341 A1* | 4/2015 | Geckler | F02D 41/0065 | 123/295 |
| 2015/0159589 A1* | 6/2015 | Freund | F02D 41/0065 | 123/568.11 |
| 2015/0176513 A1* | 6/2015 | Lana | F02D 41/1439 | 123/406.48 |
| 2015/0219028 A1* | 8/2015 | Gingrich | F02M 26/43 | 123/445 |
| 2015/0354477 A1* | 12/2015 | Leone | F02D 37/02 | 123/406.26 |
| 2016/0017847 A1* | 1/2016 | Hilditch | F02D 41/0052 | 123/406.48 |
| 2016/0102636 A1* | 4/2016 | Styles | F02D 41/006 | 123/568.21 |
| 2016/0108873 A1* | 4/2016 | Jackson | F02M 43/00 | 123/445 |
| 2016/0252027 A1* | 9/2016 | Jackson | F02D 41/0027 | 60/605.2 |
| 2016/0333830 A1* | 11/2016 | Henry | F02M 26/40 | |
| 2017/0122246 A1* | 5/2017 | Ottikkutti | F02D 41/402 | |
| 2017/0159599 A1* | 6/2017 | Perfetto | F02M 26/43 | |
| 2017/0175614 A1* | 6/2017 | Kolhouse | F02D 41/008 | |
| 2017/0328289 A1* | 11/2017 | Denton | F02M 26/43 | |
| 2017/0363057 A1* | 12/2017 | Gukelberger | F02P 5/045 | |
| 2018/0223777 A1* | 8/2018 | Gukelberger | F02M 26/21 | |

FOREIGN PATENT DOCUMENTS

| | | | | |
|---|---|---|---|---|
| JP | 10131764 A | * | 5/1998 | ......... F02D 41/0082 |
| JP | 2008128029 A | * | 6/2008 | |

* cited by examiner

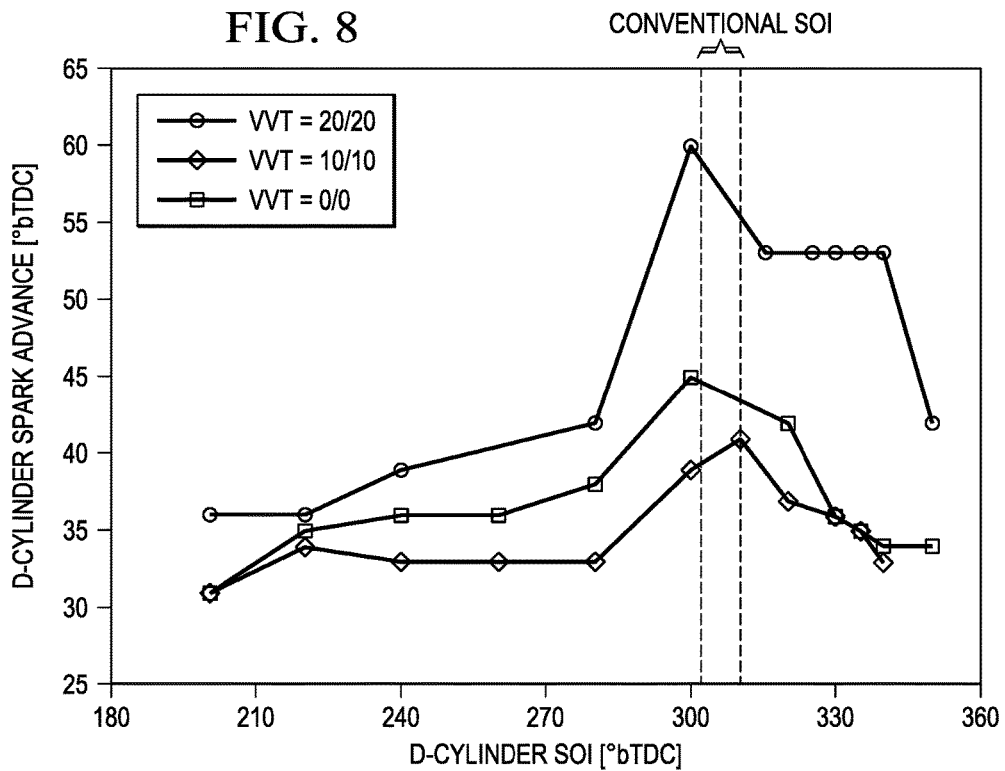
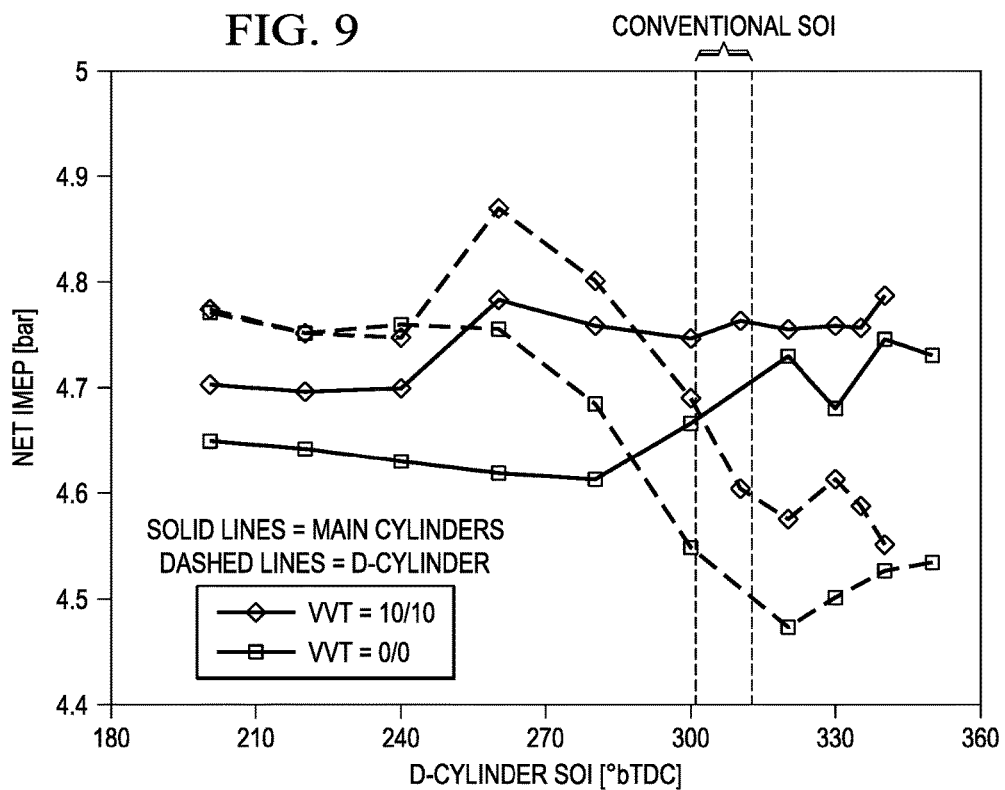

INTERNAL COMBUSTION ENGINE HAVING DEDICATED EGR CYLINDER(S) WITH DELAYED FUEL INJECTION

TECHNICAL FIELD OF THE INVENTION

This invention relates to internal combustion engines, and more particularly to such engines having one or more cylinders dedicated to production of recirculated exhaust.

BACKGROUND OF THE INVENTION

In an internal combustion engine system having dedicated EGR (exhaust gas recirculation), one or more cylinders of the engine are segregated and dedicated to operate in a rich combustion mode. Because of the rich combustion, the exhaust gases from the dedicated cylinder(s) include increased levels of hydrogen and carbon monoxide. Rich combustion products such as these are often termed "syngas" or "reformate".

Dedicated EGR engines use the reformate produced by the dedicated cylinder(s) in an exhaust gas recirculation (EGR) system. The hydrogen-rich reformate is ingested into the engine for subsequent combustion by the non-dedicated cylinders and optionally by the dedicated cylinder(s). The reformate is effective in increasing knock resistance and improving dilution tolerance and burn rate. This allows a higher compression ratio to be used with higher rates of EGR and reduced ignition energy, leading to higher efficiency and reduced fuel consumption.

BRIEF DESCRIPTION OF THE DRAWINGS

A more complete understanding of the present embodiments and advantages thereof may be acquired by referring to the following description taken in conjunction with the accompanying drawings, in which like reference numbers indicate like features, and wherein:

FIG. 8 illustrates how, with late fuel injection, the dedicated EGR cylinder becomes less sensitive to EGR dilution.

FIG. 9 illustrates net IMEPs for both the main cylinders and dedicated EGR cylinder(s) for two different variable valve timing strategies (VVT) and a range of SOI's of the dedicated EGR cylinder(s).

DETAILED DESCRIPTION OF THE INVENTION

The following description is directed to systems and methods for a dedicated EGR system installed in a vehicle, such as an automobile. As explained herein, a dedicated EGR cylinder can operate at any equivalence ratio because its exhaust will never exit the engine before passing through another cylinder operating at a stoichiometric air-fuel ratio. This allows the dedicated EGR cylinder to run rich, which produces hydrogen (H2) and CO at levels that enhance combustion flame speeds, combustion, and knock tolerance of all the cylinders.

As described below, delaying the start of fuel injection to the dedicated EGR cylinder(s), relative to the start of fuel injection to the main cylinders, has many advantages. This "delayed injection" increases the burn rates and combustion stability of the dedicated EGR cylinder. It also enables a balanced IMEP across all cylinders, even at equivalence ratios of the dedicated EGR cylinder(s) greater than what is otherwise achievable.

Conventional Dedicated EGR System (Prior Art)

Figure 1:
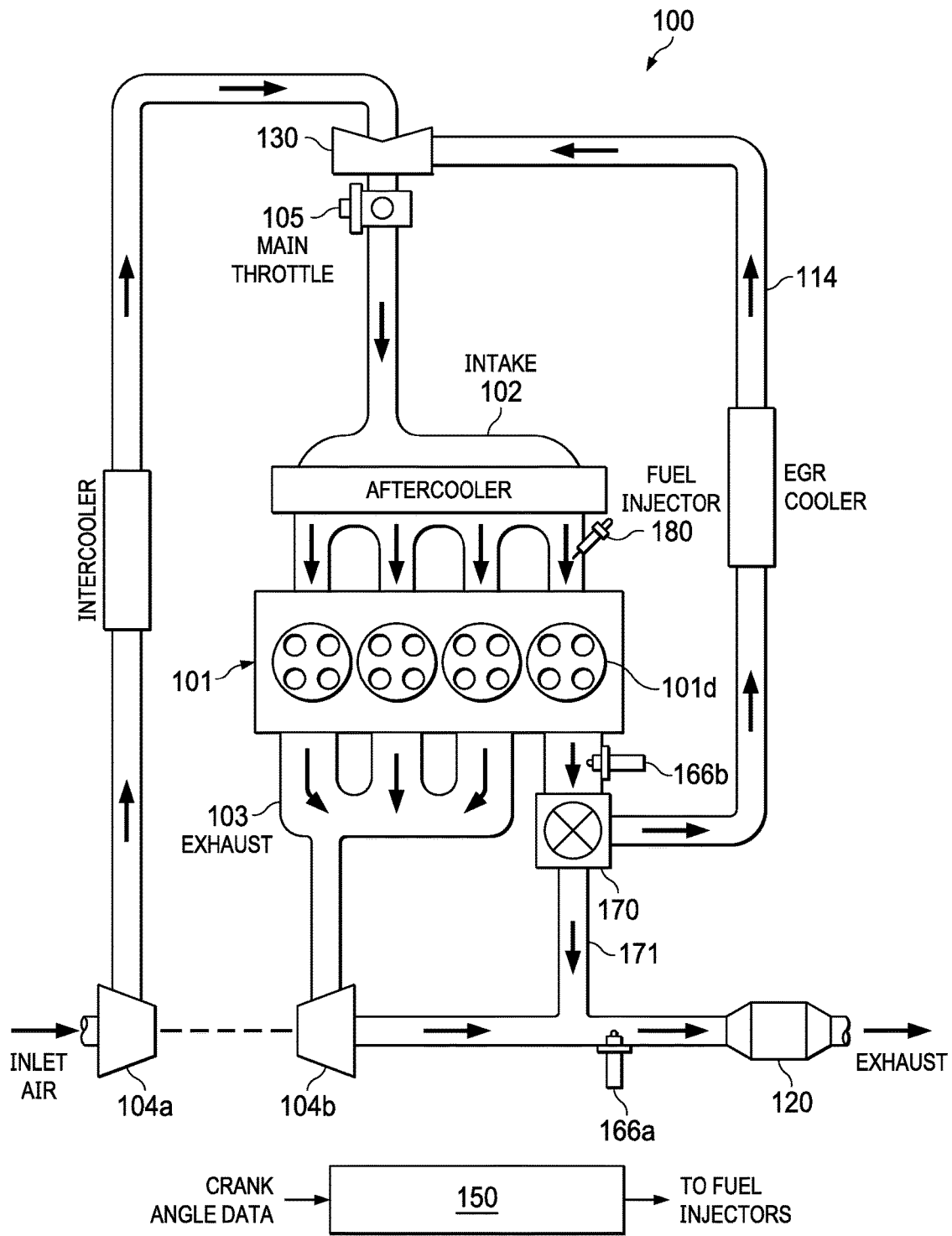
FIG. 1 illustrates a four cylinder engine with one dedicated EGR cylinder.

FIG. 1 illustrates an internal combustion engine 100 having four cylinders 101. One of the cylinders is a dedicated EGR cylinder, and is identified as cylinder 101d. In the example of FIG. 1, engine 100 is gasoline-fueled and spark-ignited, with each cylinder 101 having an associated spark plug.

The dedicated EGR cylinder 101d may be operated at any desired air-fuel ratio. All of its exhaust is recirculated back to the intake manifold 102.

In the embodiment of FIG. 1, the other three cylinders 101 (referred to herein as the "main" or "non dedicated" cylinders) are operated at a stoichiometric air-fuel ratio. Their exhaust is directed to an exhaust aftertreatment system via an exhaust manifold 103.

Engine 100 is equipped with a turbocharger, specifically a compressor 104a and a turbine 104b.

Although not explicitly shown, all cylinders 101 have a fuel delivery system for introducing fuel into the cylinders. For purposes of this description, the fuel delivery system is assumed to be consistent with gasoline direct injection, and each cylinder 101 is equipped with a fuel injector 180. It is assumed that the fuel injector timing, as well as the amount of fuel injected, for the main cylinders can be controlled independently of the fuel injector timing and fuel amount for the dedicated EGR cylinder(s). This fuel injection timing control includes at least control over the start of fuel injection, and may control other timing parameters such as duration.

In the example of this description, the EGR loop 114 joins the intake line downstream the compressor 104a. A mixer 130 mixes the fresh air intake with the EGR gas. A main throttle 105 is used to control the amount of intake (fresh air and EGR) into the intake manifold 102.

In the embodiment of this description, a three-way valve 170 controls the flow of dedicated EGR to the EGR loop or to the exhaust system. Other configurations for controlling EGR flow are possible, such as an EGR valve just upstream of mixer 130.

The four-cylinder dedicated EGR system 100 with a single dedicated cylinder can provide a 25% EGR rate. In other dedicated EGR systems, there may be a different number of engine cylinders 101, and/or there may be more than one dedicated EGR cylinder 101d. In general, in a dedicated EGR engine configuration, the exhaust of a sub-group of cylinders can be routed back to the intake of all the cylinders, thereby providing EGR for all cylinders. In some embodiments, the EGR may be routed to only the main cylinders.

After entering the cylinders 101, the fresh-air/EGR mixture is ignited and combusts. After combustion, exhaust gas from each cylinder 101 flows through its exhaust port and into exhaust manifold 103. From the exhaust manifold 103, exhaust gas then flows through turbine 104b, which drives compressor 104a. After turbine 104b, exhaust gas flows out to a main exhaust line 119 to a three-way catalyst 120, to be treated before exiting to the atmosphere.

As stated above, the dedicated EGR cylinder 101d can operate at any equivalence ratio because its exhaust will not exit the engine before passing through a non-dedicated EGR cylinder 101 operating at a stoichiometric air-fuel ratio. Because only stoichiometric exhaust leaves the engine, the exhaust aftertreatment device 120 may be a three-way catalyst.

To control the air-fuel ratio, exhaust gas may be sampled by an exhaust gas oxygen (EGO) sensor. Both the main exhaust line 122 and the EGR loop 114 may have a sensor (identified as 166a and 166b), particularly because the dedicated EGR cylinder may be operated at a different air-fuel ratio than non-dedicated cylinders.

If a dedicated EGR cylinder is run rich of stoichiometric A/F ratio, a significant amount of hydrogen (H2) and carbon monoxide (CO) may be formed. In many engine control strategies, this enhanced EGR is used to increase EGR tolerance by increasing burn rates, increasing the dilution limits of the mixture and reducing quench distances. In addition, the engine may perform better at knock limited conditions, such as improving low speed peak torque results, due to increased EGR tolerance and the knock resistance provided by hydrogen (H2) and carbon monoxide (CO).

An EGR control unit 150 has appropriate hardware (processing and memory devices) and programming for controlling the EGR system. It may be incorporated with a larger more comprehensive control unit. Regardless of division of tasks, it is assumed there is control to receive data from any sensors described herein, and perform various EGR control algorithms. Control signals are generated for the various valves and other actuators of the EGR system. Fuel delivery is controlled such that the dedicated EGR cylinder may operates at an equivalence ratio greater than that of the main cylinders.

Rich Limit of Dedicated EGR Cylinder

As stated above, a potential problem with too rich operation of the dedicated EGR cylinder 101d is that its combustion stability is adversely affected. In other words, a dedicated EGR cylinder 101d has a "rich limit". Because of this limitation, the amount of beneficial $H_2$ and CO that can be produced in-cylinder is also limited.

Figure 2:
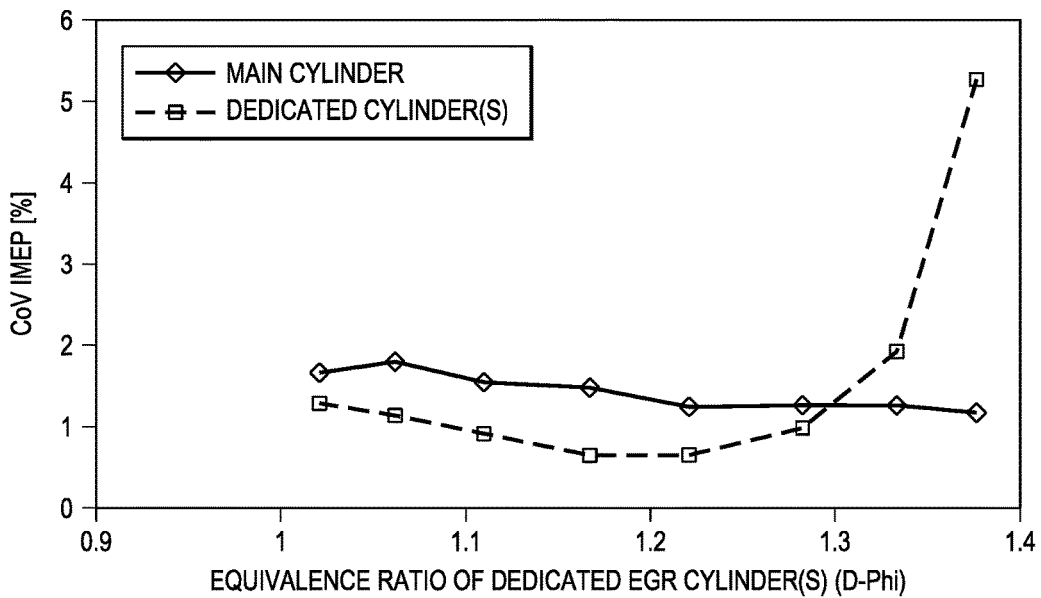
FIG. 2 illustrates the effect of enriching the equivalence ratio of dedicated EGR cylinder(s) on the coefficient of variation (CoV) of indicated mean effective pressure (IMEP) for both the dedicated EGR cylinder(s) and the main cylinders.
Figure 3:
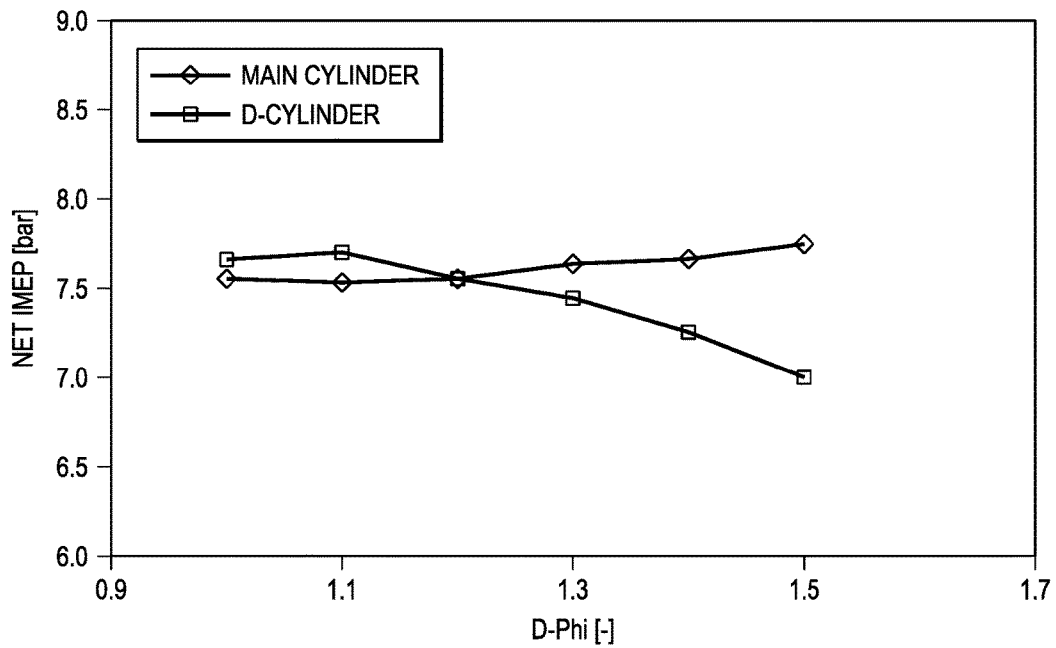
FIG. 3 illustrates the effect of enriching the equivalence ratio of dedicated EGR cylinder(s) on the net IMEP for both the dedicated EGR cylinder(s) and the main cylinders.
Figure 4:
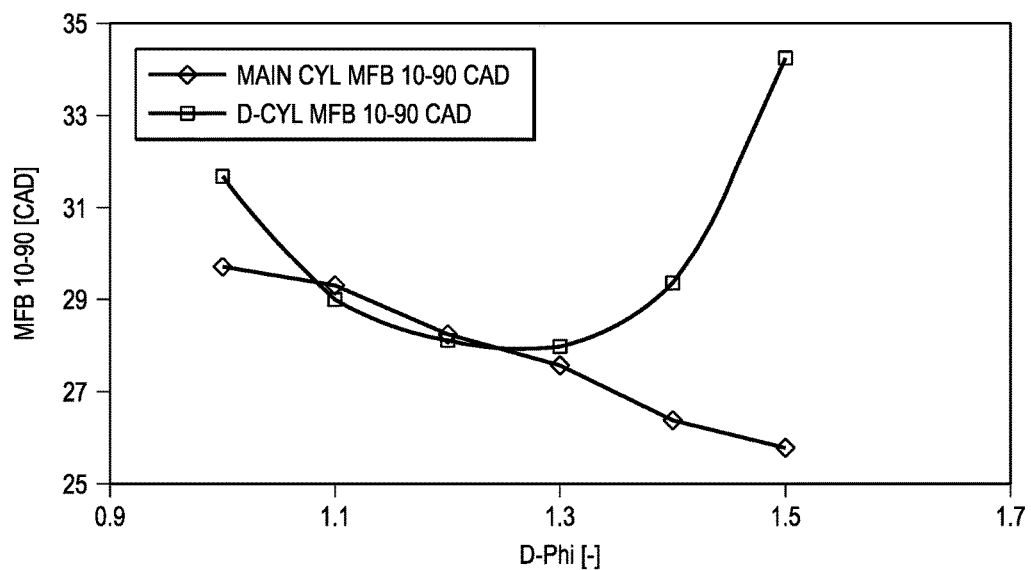
FIG. 4 illustrates the effect of enriching the equivalence ratio of dedicated EGR cylinder(s) on the burn rate for both the dedicated EGR cylinder(s) and the main cylinders.

FIGS. 2-4 illustrate how, in the absence of the method and system described below, exceeding the rich limit can adversely affect engine operation. These figures illustrate the effect of exceeding the rich limit on the CoV of IMEP, net IMEP, and burn rates, respectively, for an engine such as engine 100 of FIG. 1.

FIG. 2 illustrates the effect of enriching the equivalence ratio of dedicated EGR cylinder(s) on the coefficient of variation (CoV) of indicated mean effective pressure (IMEP) for both the dedicated EGR cylinder(s) and the main cylinders. In the example of FIG. 2, the engine was operated at 2000 rpm with 2 bar BMEP.

Mean effective pressure is a quantity relating to the operation of a reciprocating engine and is a measure of an engine's capacity to do work. When quoted as IMEP (indicated mean effective pressure), it may be thought of as the average pressure acting on a piston during the different portions of its cycle. The CoV IMEP is a measure of combustion stability, with a low value indicating good combustion stability.

An increase in the equivalence ratio (enrichment) of the dedicated EGR cylinder improves (decreases) the CoV IMEP of the main cylinders. However, at the same time, increasing the dedicated EGR cylinder(s) equivalence ratio degrades the CoV IMEP in the D-EGR cylinder. In the absence of the method described herein, the maximum enrichment in the dedicated EGR cylinder is conventionally limited to an equivalence ratio of about 1.4.

FIG. 3 illustrates another effect of enriching the equivalence ratio of dedicated EGR cylinder(s). Specifically, FIG. 3 illustrates how the net IMEP between main and dedicated cylinders deviates above an equivalence ratio of 1.3 of the dedicated EGR cylinder. An imbalanced engine causes noise and vibrations, and also imposes large stresses on the crankshaft.

FIG. 4 illustrates a third effect of enriching the equivalence ratio of dedicated EGR cylinder(s). The y-axis illustrates mass fraction burned (MFB) for both the main cylinders and the dedicated EGR cylinder(s). A dedicated EGR cylinder equivalence ratio above 1.3 results in prolonged burn durations. Prolonged burn durations lead to poor combustion stability and a less efficient combustion process.

In the examples of FIGS. 3 and 4, the engine was operated at 1500 rpm with 6.7 bar BMEP.

Late Fuel Injection of Dedicated EGR Cylinder(s)

Figure 5:
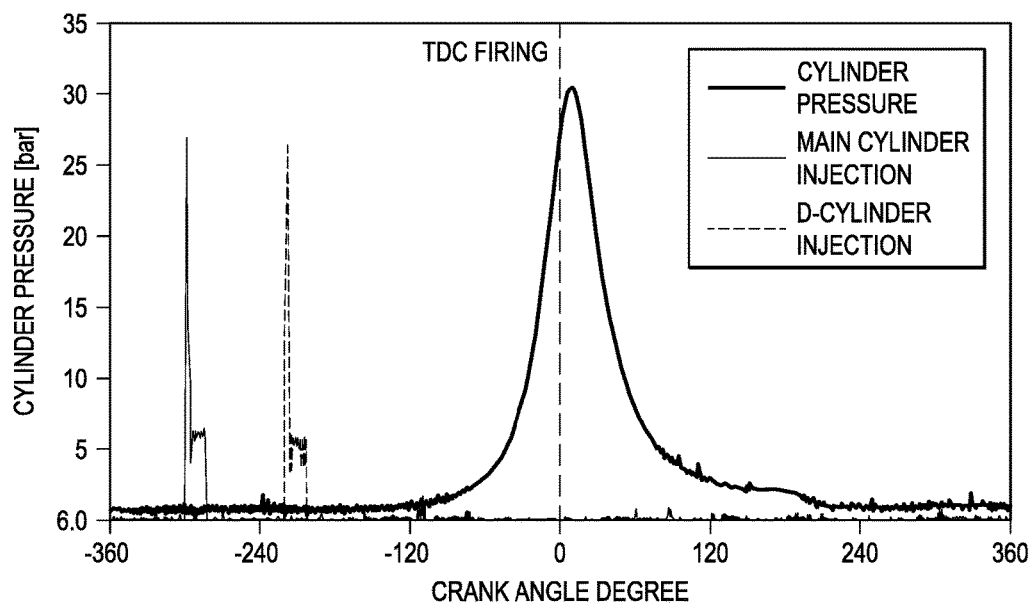
FIG. 5 illustrates a method of using gasoline direct injection to delay the start of injection (SOI) of dedicated EGR cylinder(s).

FIG. 5 illustrates a method of using gasoline direct injection to delay the start of injection (SOI) of the dedicated EGR cylinder 101d. The SOI timing of the main cylinders as well as the dedicated EGR cylinder 101d are shown, with the timing expressed in terms of crank angle degree (CAD).

The engine is assumed to be like the engine of FIG. 1, having at least one dedicated EGR cylinder 101d and multiple main cylinders 101. Fuel delivery is achieved with a direct injection fuel injector 180 associated with each cylinder. The fuel injector 180 for the dedicated EGR cylinder(s) can be controlled independently of the fuel injectors 180 for the main cylinders, so as to provide different SOI timing for the dedicated EGR cylinder(s) for fuel injection events.

The method may be implemented with appropriate programming of control unit 150. As further explained below, control unit 150 generates control signals to the fuel injectors 180 to command the start of fuel injection. The main cylinders 101 are fueled in a manner conventional for the engine. The dedicated EGR cylinder 101d is fueled in the manner described herein.

In conventional fueling, the SOI tends to be around 310 CAD before TDC (top dead center) firing. For the method of the description, the timing of the main cylinder SOI is performed conventionally.

However, the SOI of the dedicated EGR cylinder(s) is delayed. In the example of FIG. 5, the SOI of the dedicated EGR cylinder 101d was delayed approximately 100 CAD compared to SOI of the main cylinders. In other words, the delayed SOI of the dedicated EGR cylinder 101d occurs at about 210 CAD before TDC.

In the example of this description, other fuel injection timing parameters, such as duration and number of injection events per cylinder, are the same for all cylinders. However, the invention is not limited to uniform timing of these parameters.

FIGS. 6-9 illustrate how delaying the SOI of the dedicated cylinder affects various engine metrics. The engine is a dedicated EGR engine, like engine 100 of FIG. 1. For these figures, a dedicated EGR cylinder 101d was operated at a "normal" equivalence ratio of about 1.3, but as explained below, these figures suggest that higher equivalence ratios can be achieved with the delayed SOI.

For each figure, varying SOIs of the dedicated cylinder are shown in terms of crank angle degrees before TDC. The conventional SOI (and the SOI of the main cylinders) is indicated. As shown, delay times anywhere in a range of 0 to 120 or more crank angle degrees may be useful, and experimentation may show delay times of up to 200 crank angle degrees to be useful as well.

Figure 6:
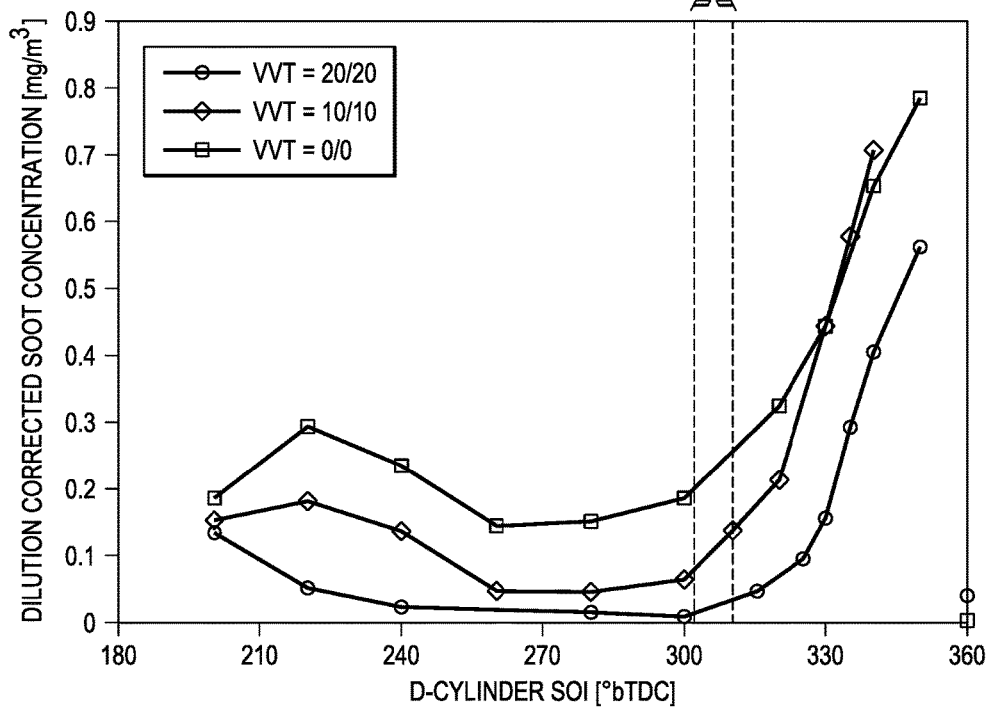
FIG. 6 illustrates particle mass emissions of engine 100 for various variable valve timing (VVT) and SOI's of dedicated EGR cylinder(s).

FIG. 6 illustrates particle mass emissions of engine 100 for various variable valve timing (VVT) and SOI's of the dedicated EGR cylinder 101d. The delayed SOI of the dedicated EGR cylinder 101d was varied from about 310 CAD before TDC to about 220 CAD before TDC (a range of about 120 CADs). These delayed SOI's for the dedicated EGR cylinder 101d allow particle mass emissions to remain below or near those of a non-delayed SOI (at 310 CAD).

Figure 7:
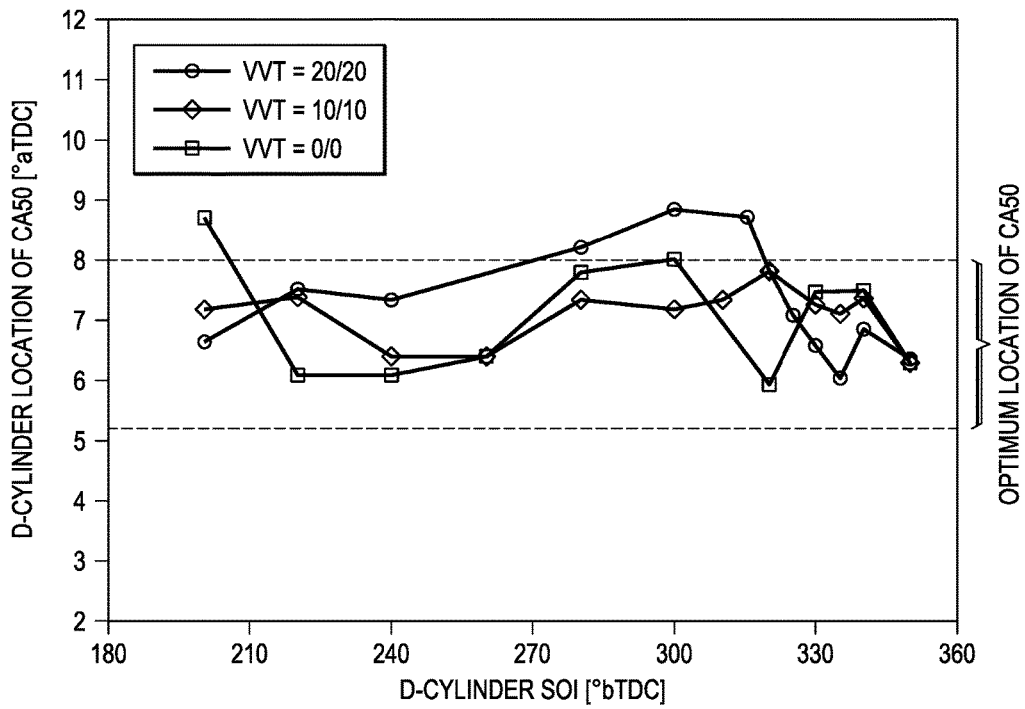
FIG. 7 illustrates the location of CA50 of the dedicated EGR cylinder for various variable valve timing (VVT) and SOI's of dedicated EGR cylinder(s).

FIG. 7 illustrates the location of CA50 of the dedicated EGR cylinder 101d for various variable valve timing (VVT) and SOI's of the dedicated EGR cylinder 101d. The CA50 timing on the y-axis of FIG. 7 is an industry standard metric of combustion phasing. More specifically, CA50 timing is the crank angle (CA) where 50% of the fuel in the cylinder has been consumed. Typically, this is optimized when CA50 is about 8 degrees after TDC. An earlier location of CA50 indicates a faster burn rate. As shown, the SOI of the dedicated EGR cylinder can be delayed within the illustrated range of delay times, while maintaining a location of CA50 between 6-8 CAD after TDC.

Furthermore, as illustrated in FIG. 8, with delayed fuel injection, the dedicated EGR cylinder becomes less sensitive to EGR dilution. In the absence of delayed SOI of the dedicated EGR cylinder(s), increased valve overlap through greater VVTs increases the amount of trapped residual and thus total EGR. As a result, burn rates decrease, combustion becomes more unstable, and additional spark advance is required to maintain combustion stability.

However, as shown in FIG. 8, at a delayed SOI of the dedicated EGR cylinder of about 210 CAD before TDC, the spark advance is nearly identical for all VVTs. This spark advance insensitivity to valve overlap and trapped residuals, greatly reduces calibration effort. This spark advance insensitivity can be compared to conventional fuel injection methods, where there can be up to a 20 CAD spark advance difference when using different levels of VVT.

FIG. 9 illustrates net IMEPs for both the main cylinders and dedicated EGR cylinder(s) for two different variable valve timing strategies (VVT) and a range of SOI's of the dedicated EGR cylinder 101d. As illustrated, in the absence of delayed SOI as described herein, when a dedicated EGR cylinder is operated at equivalence ratios≥1.3, the dedicated EGR cylinder has a lower IMEP than the main cylinders. This leads to an imbalanced engine and limiting engine operation.

However, with late SOIs, the IMEP of dedicated EGR cylinder(s) can be increased above the main cylinder IMEPs. This enables an even richer D-EGR cylinder operation and thus elevated H2 production. Moreover, with the late SOI for dedicated EGR cylinder(s), the engine can be balanced across the speed and load range even at excessively rich D-EGR cylinder equivalence ratios.

Referring again to FIG. 1, control unit 150 is programmed to implement the method described herein. It independently controls the timing (SOI) of fuel injection to the main cylinders 101 and dedicated EGR cylinder(s) 101d. It delays fuel injection to the dedicated EGR cylinder by a predetermined or calculated time after fuel injection to the main cylinders. The delay time can be determined in terms of crank angle degrees or some other measure of time.

The delay time can be a constant amount, or could be varied according to engine operating conditions, such as the current equivalence ratio of the dedicated EGR cylinder(s) or a desired cylinder IMEP balance. Regarding the latter, a current IMEP balance can be estimated from current engine operating conditions and/or sensor input, compared to a desired cylinder IMEP balance, and the delay time adjusted accordingly.

In sum, the above-described fuel injection method improves the burn rates of dedicated EGR cylinder(s) as a means to increase combustion stability and combustion efficiency. In addition, the method extends the mechanical IMEP balance limitation from equivalence ratio of ≤1.3 to 1.5 or higher. The method further enables IMEP balancing across the engine's speed/load range.

Stated another way, with late SOI for the dedicated EGR cylinder, the equivalence ratio for the dedicated EGR cylinder can be greater than with an SOI that is the same as the main cylinders, without loss of engine performance. If greater equivalence ratios for the dedicated EGR cylinders are possible, improved H2 and CO production, and thus overall engine efficiency, can be achieved.

What is claimed is:

1. A method of controlling fuel injection to cylinders of an internal combustion engine, the internal combustion engine having exhaust gas recirculation (EGR) from at least one dedicated EGR (D-EGR) cylinder, with the other cylinders being main cylinders, comprising:
    recirculating exhaust gas from the at least one D-EGR cylinder in an EGR loop that routes recirculated exhaust gas back to an intake manifold of the internal combustion engine where the recirculated exhaust gas is mixed with fresh intake air;
    estimating a net IMEP (indicated mean effective pressure) of the at least one D-EGR cylinder;
    estimating a net IMEP of the main cylinders;
    comparing the net IMEP of the at least one D-EGR cylinder to the net IMEP of the main cylinders to determine an IMEP relationship between the main cylinders and the at least one D-EGR cylinder;
    for the main cylinders: beginning fuel injection at a main cylinder injection time;
    for only the at least one D-EGR cylinder: delaying the start of fuel injection by a calculated delay time after the main cylinder injection time,
    wherein the calculated delay time is determined in response to the results of the comparing step and is determined such the calculated delay time results in a desired IMEP relationship between the net IMEP of the main cylinders and the net IMEP of the at least one D-EGR cylinder;
    for the main cylinders, providing fuel injection at a stoichiometric equivalence ratio;
    for the at least one D-EGR cylinder, providing fuel injection at a rich equivalence ratio.

2. The method of claim 1, wherein the delay time is in terms of a number of crank angle degrees.

3. The method of claim 2, wherein the start of fuel injection of the at least one D-EGR cylinder is delayed within a range of 200 to 1 crank angle degrees.

4. The method of claim 1, wherein the equivalence ratio of the at least one D-EGR cylinder is equal to or greater than 1.3.

5. The method of claim 1, wherein the main cylinder injection time is approximately 310 crank angle degrees before top dead center.

6. The method of claim 1, wherein the internal combustion engine is a gasoline direct-injection engine.

7. The method of claim 1, wherein the calculated delay time is further calculated in response to the equivalence ratio of the at least one D-EGR cylinder.

8. The method of claim 1, wherein the delay time is calculated in response to a currently desired cylinder balance.

9. The method of claim 1, wherein the desired IMEP relationship is one in which the net IMEP of the at least one D-EGR cylinder is higher than the net IMEP of the main cylinders.

10. An improved internal combustion engine, the internal combustion engine having a number of cylinders, each cylinder having an associated fuel injector, comprising:
- at least one cylinder of the number of cylinders operable as a dedicated exhaust gas recirculation (D-EGR) cylinder, with the other cylinders of the number of cylinders being main cylinders;
- an EGR loop for recirculating all of the exhaust of the at least one D-EGR cylinder to the main cylinders via an external EGR loop that routes recirculated exhaust gas back to an intake manifold of the internal combustion engine where flit the recirculated exhaust gas is mixed with fresh intake air; and
- a control unit programmed to estimate a net IMEP (indicated mean effective pressure) of the at least one D-EGR cylinder, to estimate a net IMEP of the main cylinders, to compare the net IMEP of the at least one D-EGR cylinder to the net IMEP of the main cylinders, and to control a timing of a fuel injection to each of the at least one D-EGR cylinder such that a start of fuel injection at each engine cycle is delayed by a calculated delay time after a main cylinder start of injection, wherein the calculated delay time is determined in response to the results of the comparing step and is determined such that the calculated delay time results in a desired relationship between the net IMEP of the main cylinders and the net IMEP of the at least one D-EGR cylinder, and
- wherein the control unit is further programmed to control a total amount of fuel injected such that an equivalence ratio of the main cylinders is stoichiometric and an equivalence ratio of the at least one D-EGR cylinder is rich.

11. The system of claim 10, wherein the delay time is in terms of a number of crank angle degrees.

12. The system of claim 11, wherein the start of fuel injection of the at least one D-EGR cylinder is delayed within a range of 200 to 1 crank angle degrees.

13. The system of claim 10, wherein the equivalence ratio of the at least one D-EGR cylinder is equal to or greater than 1.3.

14. The system of claim 10, wherein the main cylinder start of injection is approximately 310 crank angle degrees before top dead center.

15. The system of claim 10, wherein the internal combustion engine is a gasoline direct-injection engine.

16. The system of claim 10, wherein the calculated delay time is further calculated in response to the equivalence ratio of the at least one D-EGR cylinder.

17. The system of claim 10, wherein the desired IMEP relationship is one in which the net IMEP of the at least one D-EGR cylinder is higher than the net IMEP of the main cylinders.

* * * * *